United States Patent [19]

Edwards, Jr.

[11] 3,946,366

[45] Mar. 23, 1976

[54] ADDRESSING TECHNIQUE EMPLOYING BOTH DIRECT AND INDIRECT REGISTER ADDRESSING

[75] Inventor: Howard W. Edwards, Jr., Dracut, Mass.

[73] Assignee: Sanders Associates, Inc., Nashua, N.H.

[22] Filed: Sept. 16, 1974

[21] Appl. No.: 506,088

Related U.S. Application Data

[60] Continuation of Ser. No. 326,623, Jan. 26, 1973, abandoned, which is a division of Ser. No. 155,068, April 17, 1973, Pat. No. 3,728,689.

[52] U.S. Cl. .................................. 340/172.5
[51] Int. Cl.² ................................... G06F 13/00
[58] Field of Search ............................ 340/172.5

[56] References Cited
UNITED STATES PATENTS

| | | | |
|---|---|---|---|
| 3,249,920 | 5/1966 | Pulver | 340/172 S |
| 3,270,324 | 8/1966 | Meade | 340/172 S |
| 3,500,337 | 3/1970 | Womack | 340/172 S |
| 3,614,741 | 10/1971 | McFarland | 340/172 S |

*Primary Examiner*—Gareth D. Shaw
*Assistant Examiner*—James D. Thomas
*Attorney, Agent, or Firm*—Louis Etlinger; Joseph E. Funk

[57] ABSTRACT

A serial buss processor with detailed description of program branching and register addressing. A mask and branch instruction is utilized to effect a relative program branch of up to N + 1 address locations away from the address of the current or masking branch instruction, where N is the number of bits in the data operand. Register addressing is partly direct and partly indirect. The indirect register address scheme employs a directly addressable register, the contents of which are interpreted by an indirect address generator unit which itself is directly addressable such that a single value in the directly addressable register may be used to point to different registers.

4 Claims, 19 Drawing Figures

FIG. 5A — GENERAL FORMAT

FIG. 5B — IMMEDIATE

FIG. 5C — INTERNAL MICRO

FIG. 5D — EXTERNAL MICRO

FIG. 5E — REGISTER - REGISTER

FIG. 5F — EXTENDED OP

FIG. 5G — MASK AND BRANCH (MBR)

ADDRESSING TECHNIQUE EMPLOYING BOTH DIRECT AND INDIRECT REGISTER ADDRESSING

This application is a continuation of my copending application entitled "Indirect Register Addressing Apparatus", Ser. No. 326,623, filed Jan. 26, 1973, now abandoned, which in turn is a division of Ser. No. 155,068 now U.S. Pat. 3,728,689 entitled "Program Branching and Register Addressing Procedures and Aparatus", issued Apr. 17, 1973.

BACKGROUND OF THE INVENTION

A. Field of Invention

This invention relates to new and improved signal processing methods and apparatus and in particular to apparatus for indirectly addressing registers.

Apparatus embodying the invention, for example, may be employed to control the transfer of data and control information between two or more digital devices. One of these devices, for example, may be a general purpose computer and the other devices may be data display devices, such as cathode ray tube (CRT) displays, printers, and data entry or storage devices such as keyboard stations, tape stations and the like. In a typical application, a keyboard operator may wish to enter data into the computer and to view such data on a CRT display for editing prior to transfer to the computer. Alternatively, the keyboard operator may wish to display data which is already recorded (e.g., on a magnetic tape or in the computer memory) so as to edit and/or modify such data.

B. Prior Art

The control of most of the data transfers such as the ones required in the foregoing examples has in the past been performed by digital controllers. Thus, in a system configuration including a computer, CRT display and a key-board, a digital controller is specifically designed to interface the keyboard and the CRT display and to interface both with the computer. The controller provides the proper electrical and logical interface between all three devices as well as providing the detailed control of the CRT display and keyboard so as to leave the computer free for other tasks. However, such a controller is a special purpose device which is specifically designed to handle data transfers only between the keyboard, CRT display and computer. A major disadvantage to this "hardwired" approach is the initial design cost as well as the difficulty of modifying the design to meet future application requirements.

It has been proposed to employ a more general purpose design for digital controllers. For instance, at pages 77—91 of the "Proceedings —Fall Joint Computer Conference.", 1965, a microprogrammable controller design is described. This controller design employs a microprogram which is stored in a control memory and which contains the routines necessary to perform the control functions of transferring data from one device to another in a particular system configuration. To adapt the controller for another system configuration, the microprogram is merely changed. This controller, however, employs rather large instruction word sizes (54 bits) requiring a relatively high component count (instruction register and decoder) and a large number of connecting leads. Adding to both the component count and connecting lead number is the parallel nature of the register buses and the arithmetic and logic circuits. One result is a relatively expensive controller which does not meet the needs of growing numbers of small users who cannot afford high cost terminal devices. In addition, the high component count and large numbers of buss leads and memory read out leads are incompatible with the custom design of integrated circuitry.

BRIEF SUMMARY OF INVENTION

An object of this invention is to provide a register addressable processor which employs indirect register addressing so as to expand the number of addressable registers without increasing the width of the register addressing field.

In brief the serial buss processor disclosed herein incorporates a branch procedure which includes a logical comparison step and an address generating step. In the logical comparison step like ordered bits of a pair of N bit operands are compared for identity of bit values of a first binary significance. In the illustrated embodiment, this comparison takes the form of a logical AND function which produces a true value or a binary 1 only when its inputs, the like ordered bits of the two operands, are true or 1's. In the program address generating step, the program address is made equal to the address of the current instruction increased by one (the normal instruction cycle increment) and by Y, where Y is N minus the order of the lowest ordered bit position in which the identity occurs and where the bit orders range from 0 to N −1. For example, if the identity occurs in the 2° bit position, Y = N even though the identity may also occur for higher ordered bit positions. In the illustrated serial machine embodiment, the comparison step is performed bit serial. The generating step includes the step of generating a stream of Y pulses which are then employed to increment the computer instruction address register by a value of Y.

According to the indirect register addressing feature of the invention, the contents of a directly addressable register are interpreted by an indirect register address generating unit which is itself directly addressable. The indirect addressing unit includes a multiplexer for multiplexing different portions of the contents of the directly addressable register to a decoder which generated the indirect addressing signals. Different direct address signals, one for each different portion, control the multiplexer.

BRIEF DESCRIPTION OF THE DRAWING

In the accompanying drawing, like reference characters denote like components, and.

DESCRIPTION OF PREFERRED EMBODIMENT

Figure 1:
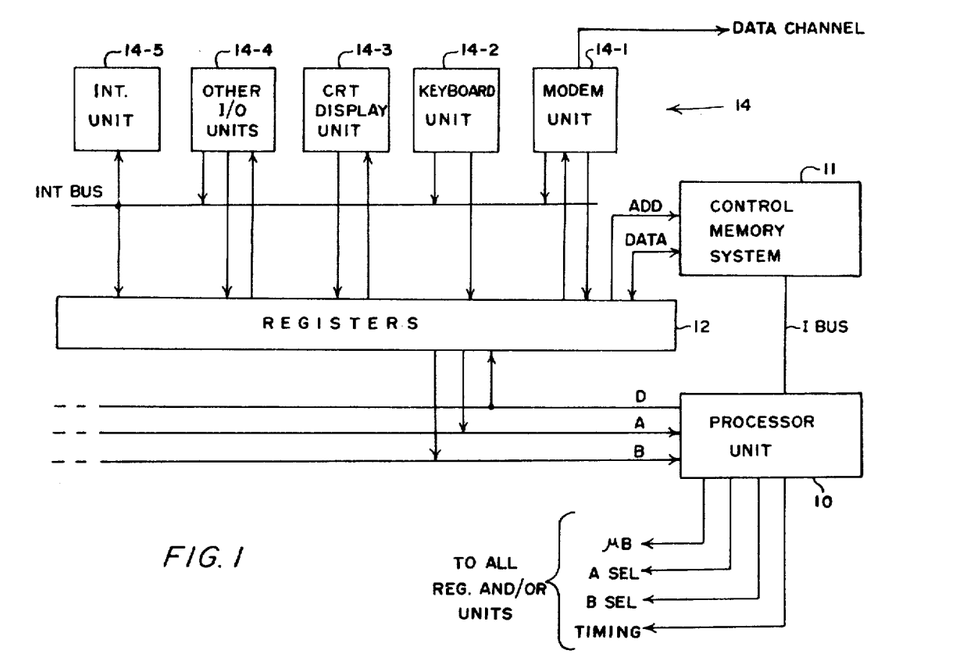
FIG. 1 is a block diagram showing the architecture of a computer in which the register addressing features of the present invention may be embodied.
Figure 2:
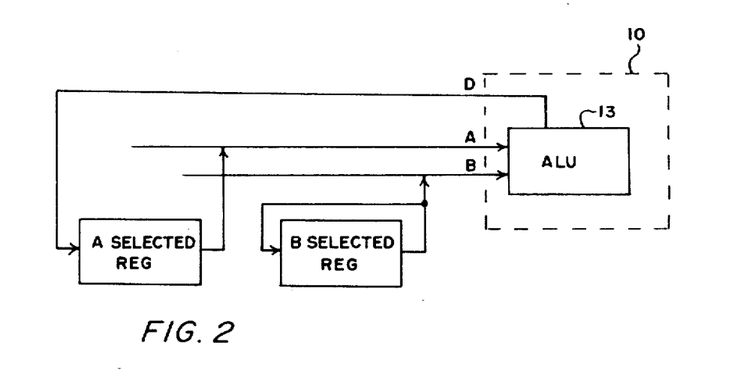
FIG. 2 is a block diagram showing the connections of addressed registers to the processor busses of the FIG. 1 computer.

The branching procedure and apparatus may be employed in any suitable stored program computer in which it is required to perform program branches. However, by way of example and completeness of description, the branching procedure and apparatus will be presented herein as embodies in a stored program computer having the general architectural arrangement illustrated in FIG. 1. The computer shown in FIG. 1 includes a processor unit 10 which is arranged to receive program instructions from a control memory system 11 and to communicate with a set of three serial busses, A, B and D which are coupled to the registers of an addressable register bank 12. As shown in both FIGS. 1 and 2, the A BUSS and the B BUSS provide data input to an arithmetic and logic unit (ALU) 13 included in processor unit 10 and the D BUSS receives the output of the ALU. Each of the registers 12 is addressable by an A select (A Sel) and a B select (B Sel) signals issued by the processor unit in response to the program instructions so as to have their contents serially gated onto the A BUSS or the B BUSS, as the case may be. The A Sel signal is also employed to serially gate the output of the ALU from the D BUSS into the register which is having its contents gated on to the A BUSS. That is, the A selected register is coupled between the D BUSS and the A BUSS as shown in FIG. 2. Also as shown in FIG. 2, a B selected register is arranged to have its contents gated both on to the B BUSS and back into its input.

The registers 12 are arranged for parallel input and/or output to a number of functional units 14 and to the control memory system 11. Although the units 14 may assume different identities for different applications, the illustrated identities are for a typical display terminal environment. In such an environment, a keyboard unit 14-2 is arranged to enter and edit data which is displayed by a cathode ray tube (CRT) unit 14-3. A modem unit 14-1 is arranged to transmit and/or receive data via a data channel to and from a remotely located data bank. The display terminal environment may also include other input/output (I/O) units 14-4 such as printers, magnetic or paper tape units, magnetic disk units and others. An interrupt unit 14-5 is also provided to process the interrupt flags placed on an interrupt buss (INT BUSS) by the keyboard, modem and other I/O units so as to cause the processor unit 10 to service the functional units 14 in an orderly manner.

Some of the registers 12 are employed for addressing the control memory system 11. One of these addressing registers will be designated the instruction address register (IAR). The control memory 11 may be either a read only memory (ROM) or a read-write (R-W) memory or a combination of both. For the case where the memory system 11 includes an R-W memory, one of the registers 12 may be employed as a memory data register.

As mentioned previously, the processor unit 10 responds to the program instructions received from memory 11 to issue the A Sel and B Sel register addressing signals. As will be explained shortly, the processor unit also provides on a micro buss ($\mu B$) a micro order field which is employed for direct control of either of the registers 12 or the unit 14. In addition, the processor unit 10 also provides system timing signals which control the operation of registers 12.

Figure 3:
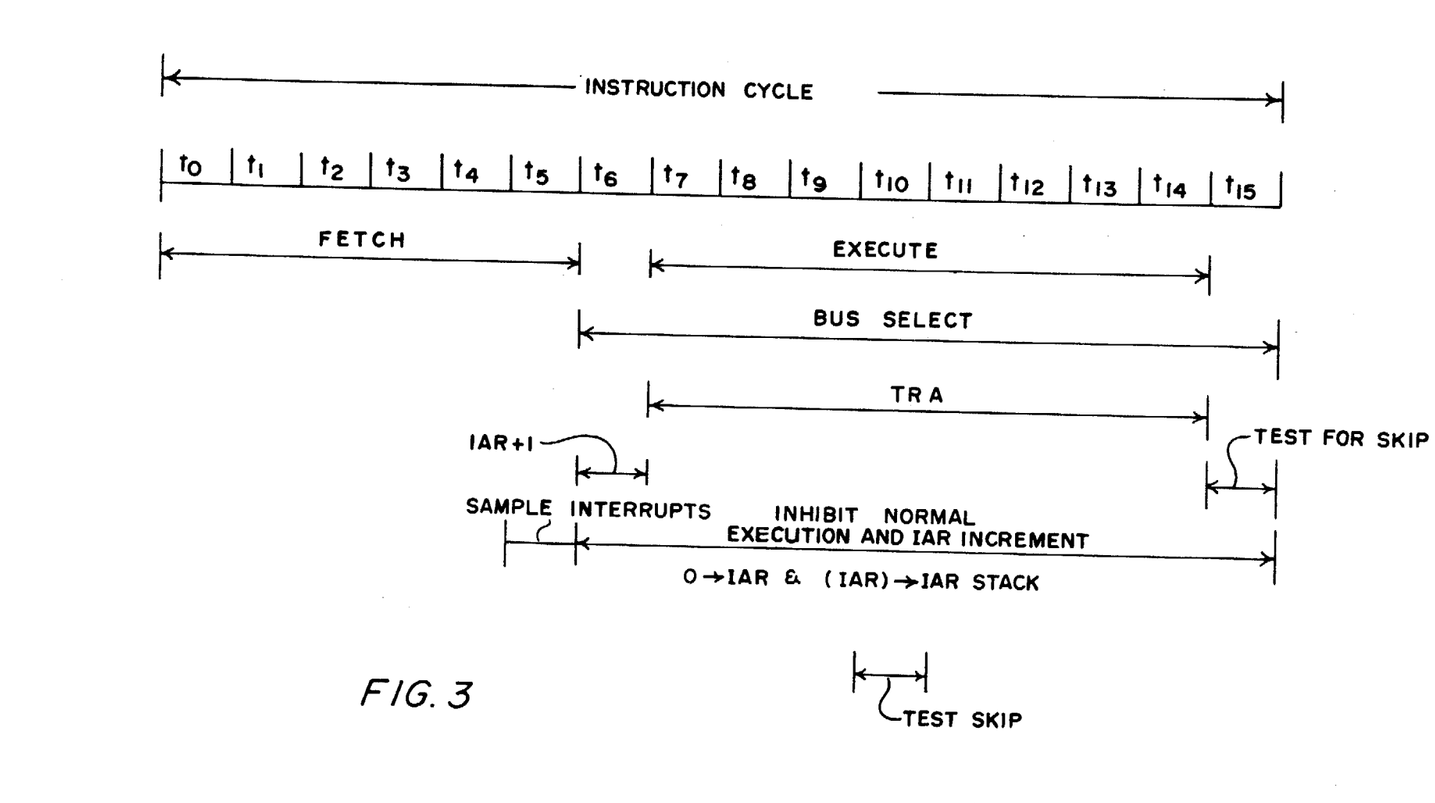
FIG. 3 is a timing diagram which illustrates the instruction cycle of the computer.

The manner in which the processor unit 10, and the memory 11, the registers 12 and the units 14 interact will become more apparent from an inspection of the system timing diagram shown in FIG. 3. As there shown, each instruction cycle is divided into 16 time slots designated as $t_0$ through $t_{15}$. Instruction fetch is performed from time $t_0$ through time $t_5$ and instruction execute is performed from time $t_7$ through $t_{14}$. The buss select signals (A Sel and B Sel) occur from time $t_6$ through $t_{15}$ so as to overlap the instruction execute period. A timing signal TRA is generated from $t_7$ through $t_{14}$ so as to condition the addressed registers for serial A BUSS or B BUSS data transfers. The instruction address register (IAR) is incremented by one (IAR+1) during time slot $t_6$. Time slot $t_{15}$ is employed to test for program skip (IAR+2) operations. The time slot $t_{10}$ is employed to test for external skip operations (i.e., program skips which are caused by the functional units 14). Finally, time slot $t_5$ is employed to sample the interrupt flags. If an interrupt flag should be set, normal execution of a current instruction is inhibited from time $t_6$ to time $t_{15}$ so as to permit the unincremented contents of the IAR to be saved by pushing into an IAR stack and to change the IAR contents to a value of zero. The value zero represents the address in memory 11 of the initial instruction of an interrupt subroutine.

Figure 4:
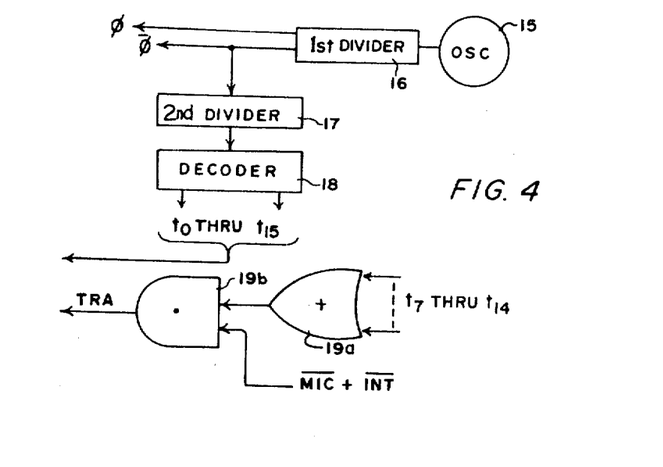
FIG. 4 is a block diagram illustrating the timing chain of the computer.

FIG. 4 shows the system timing chain in which the basic system clock signal $\phi$ and $\bar{\phi}$ are derived from the output of a first pulse divider network 16 which is driven by an oscillator 15. A second pulse divider 17 and a decoder 18 respond to the $\bar{\phi}$ clock signal so as to derive a set of 16 timing pulses, each occurring during a different one of the time slots $t_0$ through $t_{15}$. For convenience, these timing signals have also been designated as $t_0$ through $t_{15}$ throughout the drawings and the remainder of this description. Finally, the TRA signal is derived from the output of an OR network 19a which logically OR's the $t_7$ through $t_{14}$ timing signals. The output of OR gate 19a is routed through an AND gate 19b so as to inhibit the generation of the TRA signal during the execution of micro order instructions (FIGS. 5C and 5D) and during interrupt cycles when an interrupt flag is being processed. This is shown symbolically in FIG. 4 by the Boolean expression $\overline{MIC} + \overline{INT}$.

In one exemplary design of the computer system, the data word length (and hence the register length) is 8 bits and the instruction word length is 16 bits. These word lengths will be assumed for the remainder of the description. Thus, the 8 bits of an addressed register will be serially shifted out during consecutive ones of the TRA time slots $t_7$ through $t_{14}$.

Figure 5A:
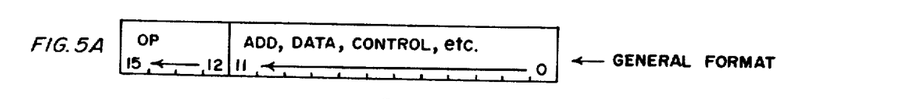
FIGS. 5A through 5G are block portrayals of the instruction set of the computer.

The general instruction format is shown in FIG. 5A to include an OP code or field in bit positions 12 through 15 (the most significant ones). The remaining 12 bits (positions 0 through 11) are employed for register addressing, data, control and the like. Of the 16 possible OP codes, 7 are designated as immediate instructions, 7 are register to register instructions, one provides for a family of micro orders and the remaining one provides for a family of extended OP code instructions.

Figures 5B, 5C:
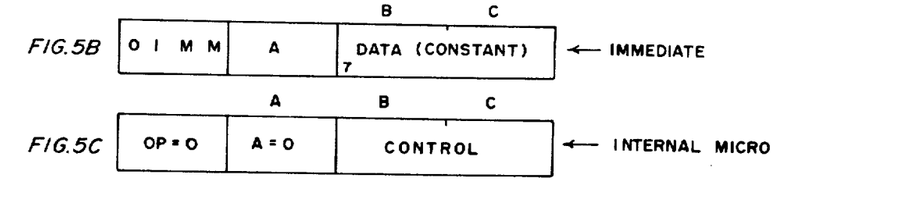

The subset of 7 immediate instructions is defined by a 0 in bit position 15 as shown by the immediate instruction format in FIG. 5B. The 7 immediate instructions operate upon a register specified by the A field in bit positions 8 through 11 and a constant stored in the data field in bit positions 0 through 7. These operations may include, for example, AND, OR, ADD, COMPARE, LOAD, MASK AND SKIP, and LOAD STACK.

Figure 5D:
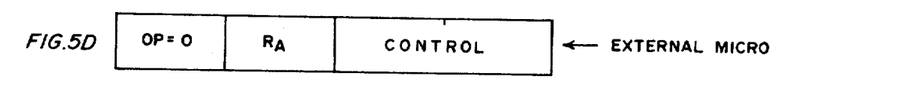

The micro-order family of instructions is identified by an all 0's OP code as shown by the formats in FIGS. 5C and 5D. These instructions are designed for use as micro-programmable instructions with the bits in positions 0 through 7 directly controlling the internal processor or external I/O device functions. When the A field is all 0's, the instruction specifies an internal processor micro-order. If there is a 1 in any portion of the A field, the A field addresses a device and/or device register upon which the bits in positions 0 through 7 are to operate. Hence the bits in positions 0 through 7 can be used by the system designer to micro-program an ancillary device. These are the signals which appear on the $\mu$B BUSS shown in FIG. 1.

The extended OP subset of instructions is defined by an OP code of 1000 as shown in FIG. 5B. The A field identifies which of the registers 12 is to be operated upon. The bits in position 0 through 7 are employed to specify the operation to be performed. This family of instructions is useful to extend or enlarge the number of operations which can be performed by the instruction set.

Figure 5E:
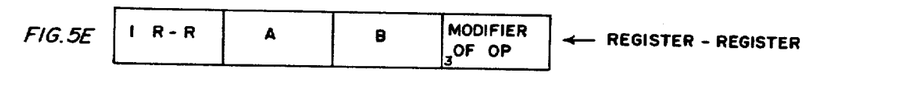
Figure 5F:
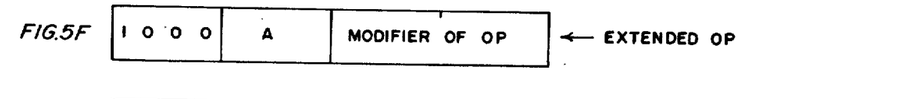

Of importance is the register to register the (R—R) family of instructions in that it contains a MASK and BRANCH instruction which is utilized in the novel branching procedure and apparatus of the present invention. As shown in FIG. 5F, the R—R subset is defined by a 1 in bit position 15 and one or more 1's in positions 12 through 14. The function specified by the OP CODE generally operates on the contents of the registers specified by the A Field (positions 8 through 11) and B field (positions 4 through 7). In addition, the bits in positions 0 through 3 are available to provide modifiers to the basic R-R instructions. The basic R—R operations include AND, EXCLUSIVE OR, MASK AND BRANCH, COMPARING BRANCH, ADD, LOAD, LOAD STACK.

The R—R modifier bit position 0 through 3 are employed to provide a pair of two bit submodifier fields. These submodifier fields can be used to specify skip tests and complementing operations. Of interest is the modifier field 0100 which specifies that the operation is to be performed upon the one's complement of the data on the B BUSS. That is, the data on the B BUSS is to be inverted.

Figure 5G:
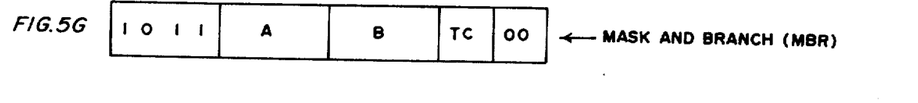

The MASK and BRANCH (MBR) instruction is identified by the OP CODE 1011 as shown in FIG. 5G. The execution of the MBR instruction requires (1) that the contents of the A Selected register be masked or logically ANDED with the contents of the B Selected register to test bit serially for a 1 and (2) that an up to 8 way branch be affected upon the occurrence of a logical one, the contents of the A and B Selected registers remaining unchanged. If the B field is all 0's and the B C Field is 01 (one's complement), then all 0's will be on the B BUSS and will be inverted in the ALU so that the comparison or mask operation will be made with all 1's.

According to the branch procedure, the MBR instruction is utilized to effect a relative program branch of up to N + 1 address locations away from the address of the current or MBR instruction, where N is the number of bits in a data operand (N=8 for the illustrated example). The entry of the MBR instruction causes a logical comparison step in which like ordered bits of the N bit operands in the A and B selected register are compared for identity of bit values of a first binary significance. In the illustrated embodiment, this comparison takes the form of a logical AND function which produces a true value or a 1 only when its inputs (the like ordered bits of the two operands) are true or 1's. The next step is a program address generating step in which the program address is made equal to the address of the current instruction (content of the IAR) augmented by one and by Y (IAR+1+Y), where Y is N minus the order of the lowest ordered bit position in which the identity occurs and where the bit orders range from 0 to N—1. Thus if the identity occurs in the $2^0$ bit position, Y = N even though the identity may also occur for higher ordered bit positions.

In the illustrated serial machine embodiment, the comparison step is performed bit serial. The generating step includes a step of generating a stream of Y pulses which are then employed to increment the IAR by a value of Y. The factor 1 in (IAR+1+Y) is caused by the normal incrementing of the IAR during an instruction cycle (time slot 6 for the present example). In other embodiments (e.g., bit parallel, word serial machines), the comparison step may be done in parallel. The generating step may then produce a value Y which is added to the incremented IAR contents (IAR+1+Y → IAR)

The MBR instruction may be located in any program routine in which it is desired to perform a program branch. The masking information (B BUSS data) must be preloaded into a B register where the mask bit pattern includes both 1's and 0's. However, no prior loading is necessary where the mask bit pattern is all 1's. This is due to the all 0's B field of the MBR instruction which causes all 0's to be on the B BUSS which are in turn inverted in the ALU by a one's complimentor in response to the 01 BC field (FIG. 5G).

The A register information which is to be masked, is loaded prior to entry of the MBR instruction. This loading may be internal, as for example, the result of a previous operation. Moreover, the A information to be masked may alternatively be loaded externally, as for example, where the A information represents discrete interrupt flags which are set by various ones of the functional units 14 via the INT BUSS (FIG. 1).

The use of the MBR instruction in an interrupt subroutine is especially attractive as it results in relatively simple interrupt processing apparatus.

Accordingly, the branching apparatus will be illustrated and described for an interrupt type application.

Figures 6, 6A:
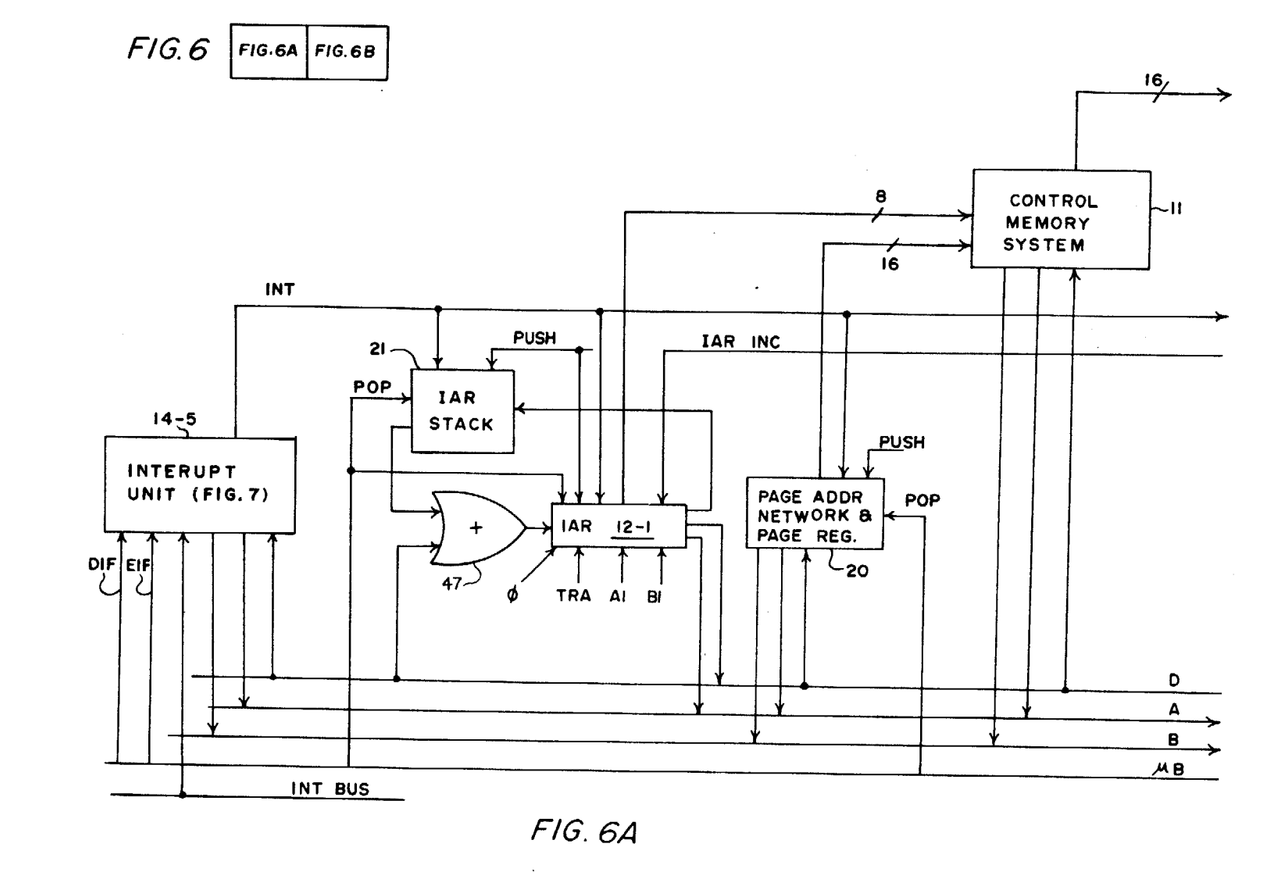
FIG. 6 is a composite showing the manner in which FIGS. 6A and 6B should be arranged.
FIGS. 6A and 6B constitute a block diagram of the computer processing unit and instruction addressing apparatus of the computer.
Figure 6B:
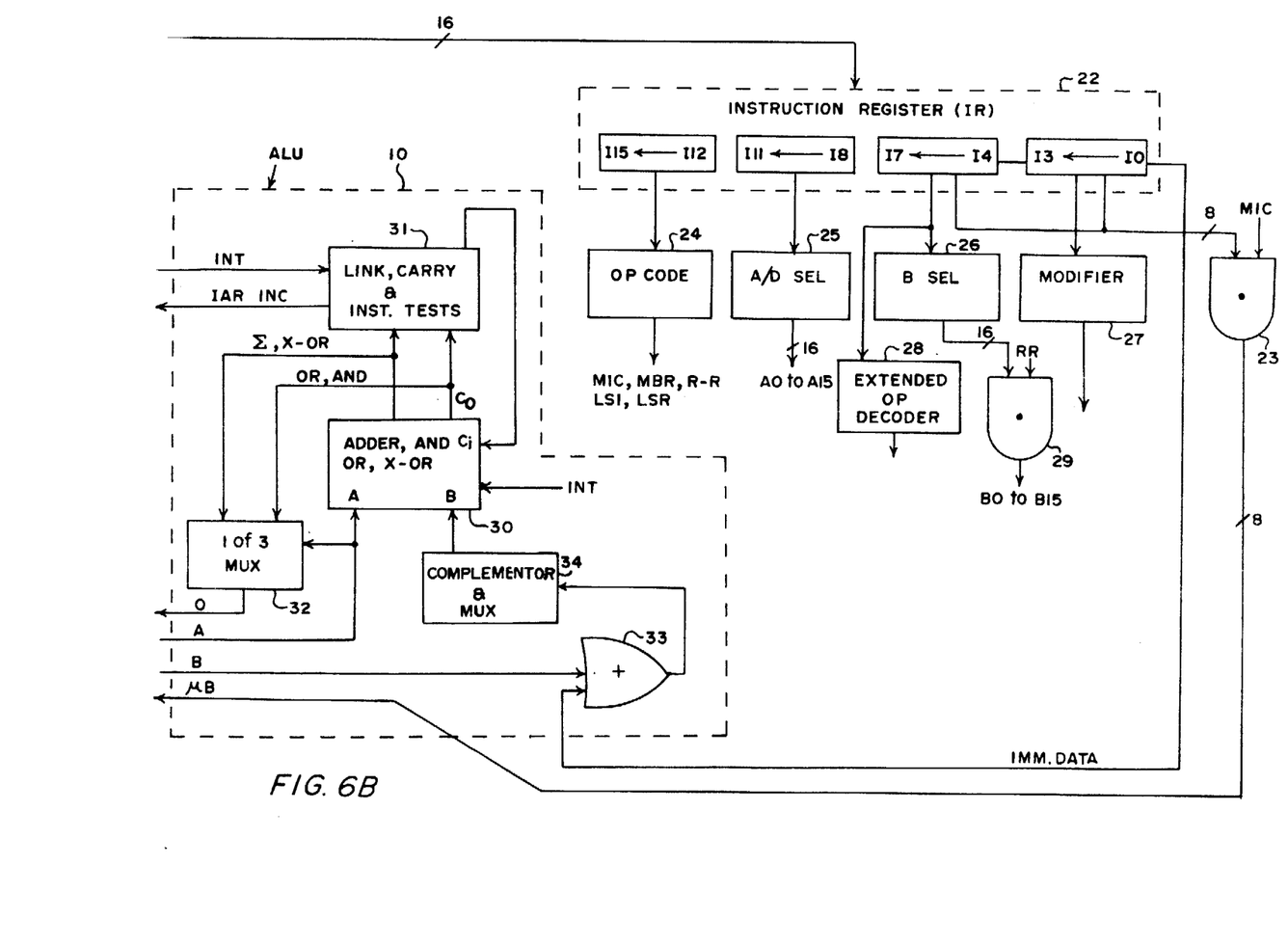

Referring next to FIGS. 6A and 6B which should be arranged according to the FIG. 6 composite, the processor unit 10, control memory system 11 and interrupt unit 14-5 are illustrated in more detail with a number of blocks containing known circuits which are actuated by bi-level electrical signals applied thereto. When the signal is at one level (say, the high level) it represents the binary digit 1, and when it is at another level it represents the binary digit 0. Also, to simplify the discussion, rather than speaking of an electrical signal being applied to a block or logic stage, it is sometimes stated that a 1 or a 0 is applied to the block or stage.

The decoder, flip-flop, adder, and logic gates or blocks shown in the drawing may take on any suitable form. For example, these known circuits may be selected from either or both of the following catalogs: Fairchild, TTL Family, October, 1970, a catalog of Fairchild Semiconductor/a Division of Fairchild Camera & Instrument Corp.; or MSI/TTL Integrated Circuits from Texas Instrument, Bulletin CB-125, a catalog of Texas Instruments, Inc. Coincidence gates are represented in the drawing with the conventional AND gate symbol having a dot therein and OR GATES are represented by the conventional OR gate symbol with a + contained therein. A small circle at the output of these gates represents a signal inversion such that the AND and OR gates become NAND and NOR gates, respectively. When a signal flow path contains more than a single lead or conductor, a slash mark is made through the path together with an adjacent number indicating the number of conductors in the path. Although only single gates are illustrated in the drawings, each such gate is in reality a gating network having a number of gates equal to the number of signal leads in the signal flow path. For example, the gating network 23 in FIG. 6B actually includes 8 separate AND gates, one for each of the 8 conductors from the 8 least significant bit positions of the instruction register (IR) 22 with each of the 8 AND gates being enabled by the MIC signal.

One final note before proceeding with the description, the signal leads have in some cases been interrupted and labeled rather than shown as continuous leads so as to avoid cluttering in the drawing. In addition, where only part of the leads of a buss or register are employed as inputs to a block, they have been labeled by their source accompanied with bit position. For example, the outputs of the instruction register 22 are labeled as I 0 through I 15 to account for the 16 bit positions thereof.

The processor unit includes an instruction register (IR) 22 (FIG. 6B) which receives a 16 bit instruction from the control memory system 11 (FIG. 6A). The IR is shown to be composed of four 4 bit parallel input and output registers which may be selected from the aforementioned catalogs. In addition, the two right hand registers which contain the 8 least significant bits I 0 through I 7 have a serial output capability and are serially coupled so that their 8 bits can be shifted on to the immediate data buss during the execute time slots $t_7$ through $t_{14}$ for the immediate instruction subset. The gating elements and timing signal connection are not shown for this operation as they are unnecessary to an understanding of the present invention. The parallel outputs of these two right hand registers are coupled via AND network 23 to the $\mu$ B BUSS to provide the external micro-order code. The AND network 23 is enabled by the MIC (micro-order instruction recognition) signal.

A set of decoder elements 24 through 28 are provided to decode the various bit fields of the instruction. The decoders 25 and 26 interpret the respective A and B fields to provide the A and B select signals A 0 through A 15 and B 0 through B 15. As such, each of these decoders may assume the form of a 1 of 16 decoder selectable from the aforementioned catalogs. The OP CODE decoder 24 may also include a 1 of 16 decoder for producing a recognition signal for each type of instruction in the instruction set. Only the instruction recognition signals which are relevant to the present invention are listed at the output of decoder 24.

The listed signals include the MBR signal (for MASK and BRANCH instruction), the LSI signal (for LOAD STACK immediate, push) LSR signal (for LOAD STACK register push) the R—R signal (register to register instruction), and the MIC signal (Micro-order subset). The decoder 24 further includes means for generating the R—R signal. This means may simply be an OR network which ORS all of the register to register instruction recognition signals so as to provide the R—R signal.

The 16 outputs of the B select decoder 26 are gated via AND network 29 to the registers 12 and units 14. The AND network 29 is enabled only by the R—R signal to assure that a register is coupled to the B BUSS only for register to register instructions.

The modifier decoder 27 may also be of 1 of 16 decoder. Only two of its outputs, OC (one's complement) and TC (two's complement), are listed in FIG. 6B, the others relating to skip tests not being germane to an understanding of the present invention. Finally, the B field (I 4 through I 7) is also shown as decoded by an extended OP DECODER 28 which may also be a 1 of 16 decoder. Since the extended OP operations are not germane to an understanding of the present invention, the signals emitted by decoder 28 are not listed or shown in the drawing.

The processor unit also includes the ALU 10 which is shown in FIG. 6B. The heart of the ALU is a serial adder 30 which receives the A and B data and a carry in ($C_i$) signal from a link, carry and instruction tests block 31. The serial adder provides its sum ($\Sigma$) and carry out ($C_o$) outputs to the block 31 and to a one of three multiplexer (MUX) 32. The MUX 32 multiplexes the $\Sigma$, $C_o$ and A data onto the D BUSS in accordance with the commands of the particular instruction being executed. Instruction recognition signal connections to the adder 30, test block 31 and MUX 32 have been omitted so as to avoid clutter of the drawing.

The logical functions of AND and OR are obtainable on the $C_o$ lead by forcing the $C_i$ signal to 0 and 1, respectively. In addition, the EXCLUSIVE OR function is obtained on the $\Sigma$ lead by forcing $C_i$ to 0.

The tests block 31 includes the conventional carry delay and link circuits which determine the $C_i$ signal and which may be forced to 1 and 0 so as to affect the aforementioned logical functions. The test block 31 also includes the IAR INC pulse circuit and the instruction and skip testing circuits. The portion of the test block 31 which is pertinent to the branching operation will be discussed in detail later.

The B BUSS data and immediate data are combined in an OR gate 33 the output of which is applied by way of a complementer and multiplexing network 34 to the B input of the adder 30. The network 34 includes a one's complementer and a two's complementer both of which are arranged to receive the output of OR gate 33 and further includes a multiplexer which receives the outputs of the one's complementer, the two's complementer and the OR gate 33 so as to multiplex one of the three to the B input of the adder 30. The portion of the network 34 which is pertinent to the branching operation will be discussed in detail later.

Referring now to FIG. 6A, the control memory 11 is considered to be organized into 16 pages of instructions with 256 instructions per page. The page address network 20, which includes a page address register, is employed to address the memory pages. The page address network further includes a 1 of 16 decoder for placing a page selector signal on one of the 16 page address leads to the memory system 11. An instruction address register (IAR) 12-1 is employed to address the instructions included in an addressed page. The IAR 12-1 and the page address register are included within the register bank 12 of FIG. 1 and are therefor shown to be coupled with the D BUSS, A BUSS, and B BUSS. Also in FIG. 6A, one of the registers 12, a memory data register, has been included within the memory system 11 so as to simplify the drawing. Typical examples of the register 12 and of the IAR 12-1 will be given in FIGS. 10 and 11. Suffice it to say here that the IAR-12-1 has an 8 bit parallel output capability, a serial input and output capability and a counting capability all under control of the $\phi$ clock signal, TRA signal (FIGS. 3 and 4) and the A1 and B1 register select signals, where A1 and B1 are the register address or select signals for the IAR 12-1. The IAR responds to the IAR INC signal from the ALU to increase its contents by one. In order to simplify the discussion, the contents of the IAR will sometimes be referred to as simply the IAR.

The 8 bit parallel output of the IAR represents the instruction address which is applied to the control memory system 11. The IAR is also shown to be serially coupled in a loop with an IAR stack 21, which is useful to save the IAR value in the case of program interrupt, calls, branches and the like. To this end, an OR Network 47 serves to OR the output of the IAR stack 21 and the D BUSS with the serial input of the IAR 12-1. The IAR stack 21 includes an ordered sequence of registers which are arranged to respond to a PUSH stack signal to push their respective contents to the next lower ordered register down the register stack sequence. The IAR 12-1 also responds to the PUSH signal so as to transfer its present IAR contents to the highest ordered register in the stack. The stack is "popped" by a POP signal applied to both the stack 21 and the IAR 12-1. When this happens, the contents of the highest ordered stack register are popped or transferred into the IAR 12-1.

The POP stack signal is derived from a micro-order control field on the $\mu$ B BUSS. The PUSH stack signal, on the other hand, is derived from a load stack instruction in either the immediate subset or in the R—R subset and may, for example, be the logical OR of the two recognition signals LSI and LSR.

The LAR-12-1 and the IAR stack 21 also respond to an interrupt (INT) signal to push the stack. The INT signal also inhibits the D BUSS input to the IAR 12-1 so that the IAR assumes an all 0's state by the termination of the pushing operation. The all 0's state represents the initial memory address of an interrupt sub-routine which processes the interrupts.

The INT signal is generated by the interrupt unit 14-5 whenever the processor unit is not in the interrupt subroutine and one or more of the interrupt flags are raised on the INT BUSS. To this end, the interrupt unit 14-5 includes one of the registers 12, designated as 12-2 in FIG. 7. As there shown, the discrete flip-flop stages of the register 12-2 receive 8 interrupt flags in parallel from the INT BUSS. An OR network 35 is arranged to sense whenever any one or more of the interrupt flags is or are raised (binary 1's). Assuming that the program is not in the interrupt subroutine, a D flip-flop 36 will be in a reset condition with its Q output being a 0. A binary 1 output of OR network 35 will enable the D input so that the next ensuing $\phi$ clock pulse will switch the flip-flop so that its Q output becomes a 1.

Figure 7:
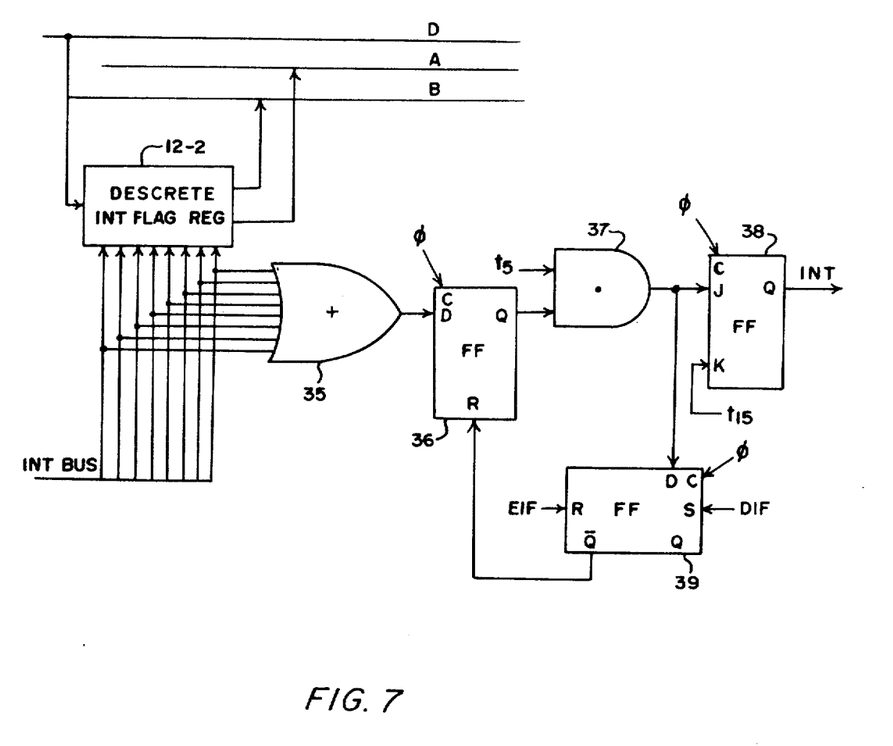
FIG. 7 is a block diagram, in part, and logic schematic, in part, showing the interrupt processing appara

On the next ensuing $t_5$ time slot, an AND gate 37 will sample the binary 1 output of flip-flop 36 so as to present a 1 enabling input to the J terminal of flip-flop 38 and to the D terminal of flip-flop 39. It is to be noted that whenever the Q output of flip-flop 36 is a 0, the output of gate 37 will remain a zero during the $t_5$ sampling time. On the next ensuing clock pulse $\phi$ (still during time slot $t_5$) each of the flip-flops 38 and 39 will assume the state where their respective Q outputs are binary 1's. The flip-flop 38 is the interrupt cycle control flip-flop and its Q output represents the INT signal shown in FIGS. 6A and 6B. This signal remains a binary 1 until the end of the execute portion cycle when it is reset during time slot $t_{15}$.

The flip-flop 39 serves to lock up the interrupt circuitry in that its $\overline{Q}$ output serves to inhibit the flip-flop 36 from responding to interrupt flags while the processor unit is in the interrupt subroutine. To this end, the flip-flop 39 is placed in an enabled condition at the end of the interrupt subroutine by an enable interrupt flag (EIF SIGNAL) which is generated by a micro-order instruction. That is, a micro-order instruction is placed in the interrupt subroutine so as to generate the EIF SIGNAL at the appropriate time. The EIF SIGNAL is applied to the dc reset terminal of the flip-flop 39 so as to cause its $\overline{Q}$ output to assume a binary 1 state. This binary 1 is applied to the dc reset terminal of the sampling flip-flop 36 so as to enable flip-flop 36 to respond to the interrupt flags as they are raised.

When an interrupt flag is raised, flip-flop 39 changes its state during the $t_5$ sampling interval so that its $\overline{Q}$ output assumes the binary 0 state.

In addition, flip-flop 39 may be set by a microinstruction (DIF) to disable the interrupt network (i.e., FF39 $\overline{Q}$ = binary 0), this instruction can occur at any program location where it is desirable to block interrupts momentarily. The network is then reenabled by the EIF SIGNAL.

As pointed out previously, the branch procedure is especially useful in an interrupt subroutine to perform a potential 1 of 8 program branch. This is accomplished by including a mask and branch instruction in the interrupt subroutine. The configuration of the processor unit and registers which occurs in response to the mask and branch instruction is shown in some detail in FIG. 8. As there shown, the discrete interrupt flag register 12-2 is selected by the MBR instruction A field to be connected between the D and A BUSSES. Another register 12-3 is selected by the B field of the MBR instruction to be connected to the B BUSS. The register 12-3 contains the masking pattern for patterns which include both 1's and 0's. As such the register 12-3 is preloaded either by an external functional unit 14 or under program control during a prior instruction cycle. As discussed previously, the register 12-2 stores the interrupt flags which are raised on the interrupt buss. The TRA, D, and A and B select signals will cause the contents of the registers 12-2 and 12-3 to be gated or shifted on to the A and B BUSSES serial by bit during the time slots $t_7$ through $t_{14}$.

Figure 8:
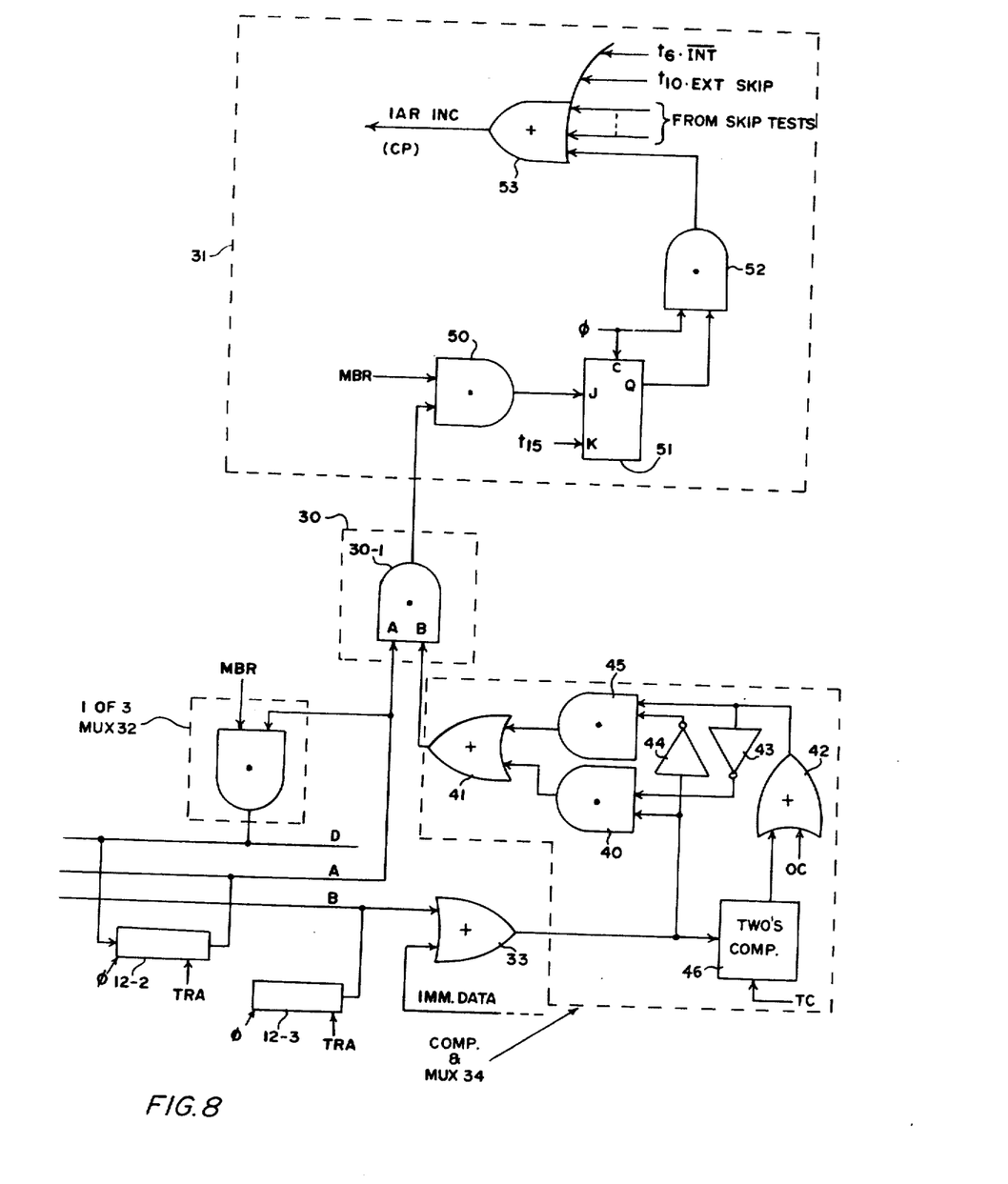
- FIG. 8 is a block diagram in part and a logic schematic, in part, illustrating the parts of the computer processor unit which are employed in the branching apparatus.

For the case where the mask pattern is stored in register 12-3 (i.e., B field 0), the B data is propagated through the complementer and MUX 34 to appear at the B input of adder 30. The signal flow path is via OR gate 33, AND gate 40 and OR gate 41. The AND gate 40 is enabled at this time since the OC and TC signals are 0's.

The adder 30 is shown in FIG. 8 symbolically as an AND gate 30-1 so as to represent the comparison function being performed on the A and B data. As pointed out previously this ANDING function will be performed in the adder by forcing the $C_i$ (carry in) signal to a 1 and taking the AND function from the carry out ($C_o$) lead. The adder output then will be a 1 when like ordered ones of the A and B data bits are ones and will otherwise be a zero.

The first binary one output of the adder 30 during the MBR execute time will be sampled by an AND gate 50 and a flip flop 51 included in the test block 31. The AND gate 50 is shown to be enabled by the MBR recognition signal. Its output is applied to the J terminal of the JK flip flop 51 so as to enable flip flop 51 to be placed in its set state (Q=1) when the first binary 1 output of the adder 30 occurs, the clock $\phi$ also occurring each sample time or time slot. The flip flop 51 will then remain set until the end of the MBR instruction execute time at $t_{15}$ when it is reset. Accordingly, any further binary 1 outputs of the adder 30 will be ignored by the sampling of flip flop 51.

The binary 1 output of the sampling flip flop 51 enables an AND gate 52 to pass the clock pulses $\phi$ via an OR gate 53 to the IAR INC lead and hence, to the IAR. Since the clock pulse $\phi$ occurs during each time slot, the total number of pulses passed by gate 52 will depend upon which time slot the adder output first becomes a 1. For example, if the lowest ordered bits of the A and B data are both ones, the flip flop 51 will be set during time slot $t_7$ and eight $\phi$ pulses will be passed by AND gate 52, thereby causing the IAR to change its value by eight. On the other hand, if only the highest ordered bits of the A and B data are both ones, the flip flop 51 will be set only during the time slot $t_{14}$. In this case, AND gate 52 will pass only one clock pulse $\phi$ so as to increment the value of the IAR by one.

If the MASKING pattern is to be all ones, the MBR B field will be all 0's. This will result in none of the registers 12 being selected for connection to the B BUSS. As a result, during the execute time the B BUSS will appear to have all 0's thereon. When the B field is all 0's, the ones complement OC signal will be a 1. The OC signal is passed by an OR gate 42 to enable an AND gate 45. The OC signal is also inverted by inverter 43 so as to disable AND gate 40. The all 0's on the B BUSS will be inverted by an inverter 44 so as to become all 1's. These 1's will be passed by the enabled AND gate 45 and OR gate 41 to the B input of adder 30. The operation of the adder and the test block 31 will be the same for the all ones masking pattern as for the previously discussed mixed ones and zero's pattern.

The two's complementer network 46 is shown in FIG. 8 so as to demonstrate the two's complement operations can be performed. Since these operations are not germane to an understanding of the invention, the two's complementer will not be described in detail.

The OR gate 53 and test block 31 also receives a number of other inputs. One of these inputs is the normal instruction cycle IAR + 1 operation which occurs during time $t_6$. This operation is shown symbolically in FIG. 8 by the Boolean expression $t_6 \cdot \overline{INT}$ to indicate that it occurs except when the INT signal is present. This incrementing pulse during time $t_6$ represents the factor 1 in the aforementioned branching expression IAR + 1 + Y.

Another of the OR gate 53 inputs is derivable from the external skip BUSS. This operation is also shown symbolically by a Boolean expression $t_{10} \cdot$ EXT SKIP to indicate that it occurs during the $t_{10}$ time slot when an external skip flag is raised. This feature allows a functional unit 14 to cause a program skip. The remainder of the inputs to OR gate 53 come from various skip test circuitry in tests block 31, which circuitry is not shown.

Figure 9:
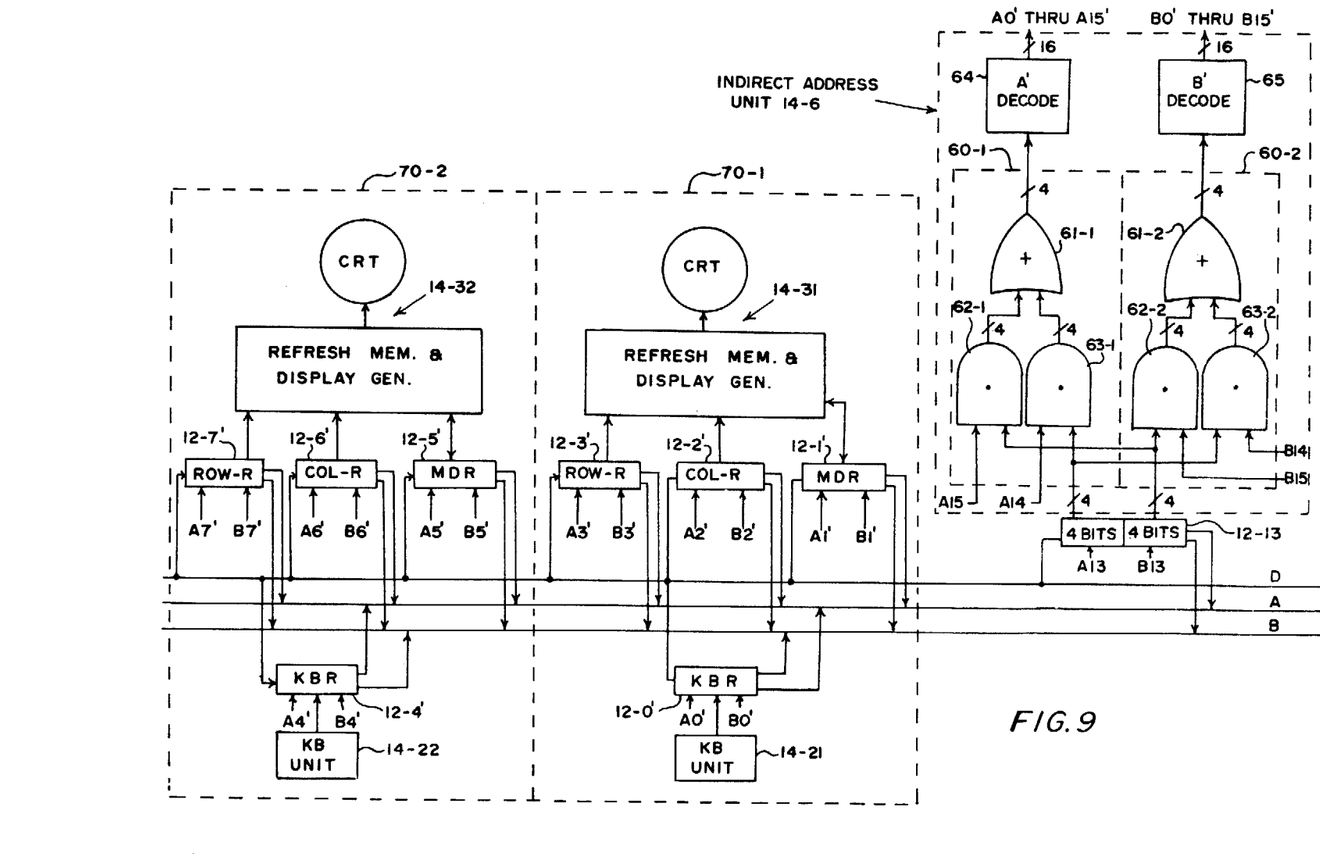
FIG. 9 is a block diagram, in part, and a logic schematic, in part, illustrating the indirect address feature of the present invention.

With reference now to FIG. 9, the indirect register addressing feature in accordance with the teaching of my invention will be described. This feature allows the number of addressable registers to be expanded beyond the limits imposed by the instruction A and B field sizes. For instance, the exemplary four bit A and B field sizes allow only 16 registers to be directly addressed. Moreover, the indirect register addressing feature of the invention allows program subroutines to be time shared by different, but identical functional devices. Thus, the indirect register addressing feature is applicable to any situation where it is desired to expand the number of addressable registers or to allow a common program to be time shared. However, by way of example, the indirect addressing feature is shown in FIG. 9 for a multiple CRT terminal situation where each CRT terminal employs four addressable registers. Although two such CRT terminals 70-1 and 70-2 are shown in FIG. 9, the system may be designed to handle any desired number of such CRT terminals.

Also shown in FIG. 9 is the indirect address unit 14-6. Although the other functional units 14 (see FIG. 1), the control memory 11 and the processor unit 10 are not shown in FIG. 9 for reasons of clarity, it is to be understood that these devices are connected to the processor busses D, A and B.

The two CRT terminals are substantially identical so that only the terminal 70-1 will be described in detail. It should be noted that similar components of the terminal 70-2 bear the same reference numerals as their counterparts in the terminal 70-1 except that the last digit is a 2 instead of a 1. The CRT terminal 70-1 employs four addressable registers, 12-0' through 12-3', the primes being employed to identify registers which are indirectly addressable. The register 12-0' is arranged to receive parallel data input from the keyboard unit 14-21. The register 12-1' serves as a memory data register for the refresh memory and display generator 14-31. Finally, the registers 12-2' and 12-3' serve as the column and row cursor address registers, respectively. In the terminal 70-2 the register counterparts for register 12-0' through 12-3' are 12-4' through 12-7', respectively.

The indirect register address unit 14-6 is arranged to respond to the contents of a directly addressable register 12-13 to generate the indirect address signals A0' through A15' and B0' through B15' which are employed to address the CRT terminal registers. The indirect address unit 14 can be configured so that the contents of register 12-13 point to any desired number of indirectly addressable registers. However, the unit 14 is illustrated in FIG. 9 for the case where the contents of register 12-13 can point to either of two CRT terminal registers. This two register case is especially useful for register to register data operations called for by the register to register instruction subset (see FIG. 5E). For this situation, the register 12-13 is treated as two four bit fields or segments by the indirect address unit 14-6 with each field being capable of pointing to sixteen registers. Which of the two fields is utilized is determined by the direct address signals A14, A15, B14 and B15. That is, the indirect address unit 14-6 is itself directly addressable to select one of the two four bit fields in the register 12-13.

The direct address signals A14 and A15 are applied to a multiplexer 16-1 which serves to connect one of the two four bit fields to an A' decoder 64. The decoder 64 responds to the addressed or selected four bit field to generate on one of its 16 output leads a corresponding one of the indirect address signals A0' through A15'. The direct address signals B14 and B15 are applied to another multiplexer 60-2 which serves to connect one of the two four bit fields to a B' decoder 65. The B' decoder 65 responds to the addressed four bit field to generate on one of its 16 output leads a corresponding one of the address signals B0' through B15'. The A' and B' decoders may suitably be one of 16 decoders which are selectable from the aforementioned catalogs.

The multiplexers 60-1 and 60-2 are substantially identical such that like components in the two multiplexers bear like reference numerals which are hyphenated to a 1 for multiplexer 60-1 and to a 2 for multiplexer 60-2. Accordingly, only the multiplexer 60-1 will be described in detail. The multiplexer 60-1 includes a pair of AND gate networks 62-1 and 63-1 which have their outputs combined in an OR network 61-1. Each of these networks includes four gates, with the OR gates of network 61-1 ORRING like ordered ones of the four bit outputs of networks 62-1 and 63-1.

The A14 and B14 direct address signals are applied to the networks 63-1 and 63-2, respectively, so as to select or address the left hand four bit field. That is, an R—R instruction having its A and B fields equal to A14 and B14, respectively, selects the four left hand bits of register 12-13 for the generation of the A' and B' indirect address signals. On the other hand, the direct address signals A15 and B15 are applied to the gating networks 62-1 and 62-2 so as to select the four right hand bits of register 12-13 for the generation of the A' and B' indirect address signals.

With the above described indirect register addressing apparatus, common program routines can be employed for such operations as data transfer from the keyboard register to the memory data register, cursor address updating, and others. Prior to entry into a common routine, the register 12-13 must be loaded with the value which essentially determines which of the CRT terminals 70-1 or 70-2 is to be operated upon by the program routine.

Although separate memory data registers 12-1' and 12-5' are shown in FIG. 9, it is possible to employ a single memory data register which is time shared by the several CRT terminals. In such case, the single memory data register could be directly addressable.

Figure 10:
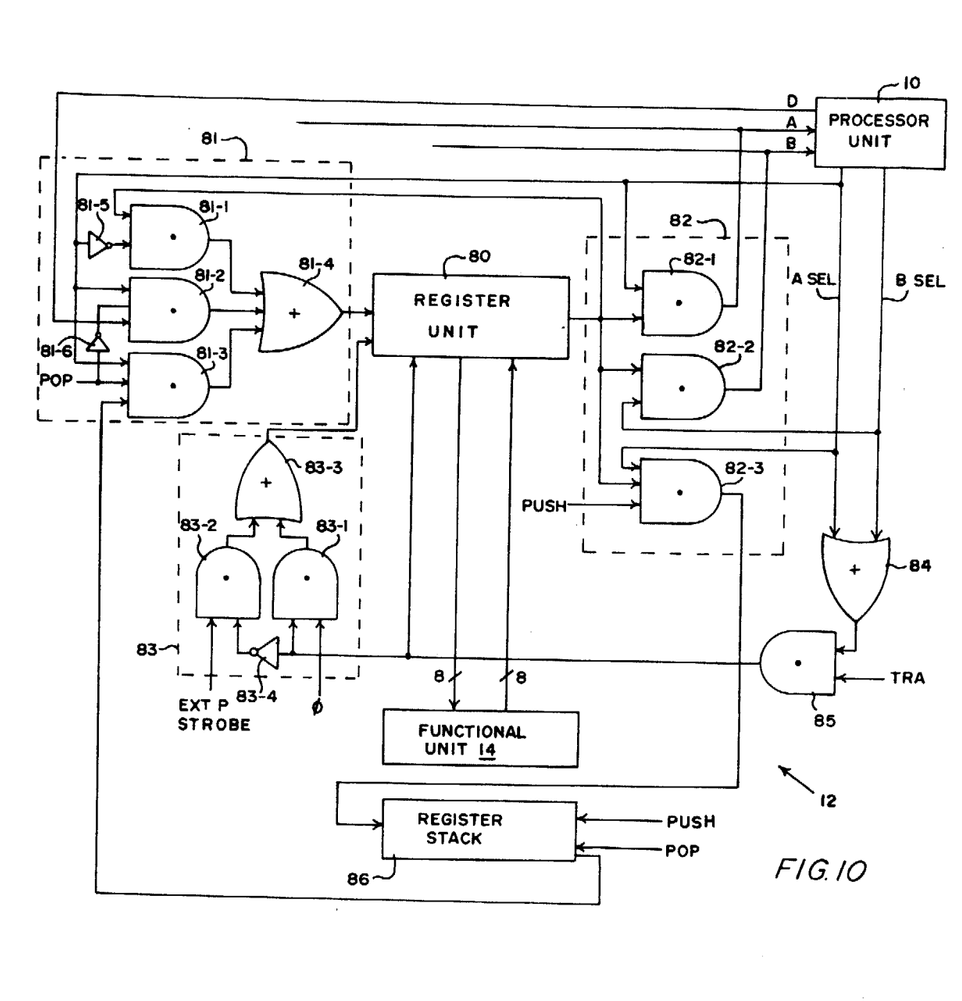
FIG. 10 is a block diagram, in part, and a logic schematic, in part, illustrating an exemplary register which may be employed in the computer.

With reference now to FIG. 10, one type of register 12 which may be employed will be described. As shown in FIG. 10, the register 12 includes a basic register unit 80, input multiplexing unit 81, and output demultiplexing unit 82 and a clock signal multiplexing unit 83. The register unit 80, which may be selected from the aforementioned catalogs, has parallel input and output to an associated functional unit 14 and serial input from multiplexer 81 and serial output to multiplexer 82.

The register unit 80 is placed in the serial operating mode by a true or 1 value of a mode control signal (SER) and in the parallel operating mode by a 0 value of the same signal. The SER mode control signal is derived by means of an OR gate 84 which ORS the A select and B select signals for the register 12 and by means of an AND gate 85 which ANDS the output of OR gate 84 with the TRA execute control signal. Thus, the SER control signal will be a 1 only during time slots $t_7$ through $t_{14}$ whenever the register 12 is selected by either the A Sel or B Sel signals and will be a 0 at all other times.

The input multiplexer 81 includes a level of AND gates 81-1, 81-2 and 81-3. Another gating level includes an OR gate 81-4 which combines the outputs of the first level AND gates to provide the serial input to the register unit 80. The demultiplexing unit 82 includes a level of AND gates 82-1 and 82-2 and 82-3 which are arranged to gate the serial output of the register unit 80 on to a number of different leads. The multiplexer 83 includes a first level of AND gates 83-1 and 83-2 which have their outputs combines in an OR gate 83-2 so as to provide the clock or strobe input into the register unit 80.

Before discussing the various signal paths provided by the units 81 and 82, the clock signal multiplexer 83 will be briefly described. A 1 value of the SER mode control signal enables the AND gate 83-1 to pass the clock signals $\phi$ via OR gate 83-3 to the register unit 80. The SER signal is inverted by means of an inverter 83-4 so as to inhibit the AND gate 83-2 when the SER signal is a 1 and to enable the AND gate 83-2 when the SER signal is a 0. When AND gate 83-2 is enabled, the external P strobe is passed by gate 83-2 and OR gate 83-2 to the register unit 80.

When the A Sel signal is a 1, the register unit 80 is adapted for serial operation with its input coupled to the D BUSS and its output coupled to the A BUSS. To this end, the input multiplexer 81 includes an AND gate 81-2 which is enabled by the A Sel signal to pass data from the D BUSS via OR gate 81-4 to the serial input of the register unit 80. The A Sel signal also enables an AND gate 82-1 in demultiplexer 82 to pass the serial output of the register unit 80 to the A BUSS. It should be noted that the serial output of register unit 80 is also passed directly through the demultiplexer unit 82 to the input multiplexer AND gate 81-1. However, the gate 81-1 is disabled at this time since the 1 value of the A Sel signal is inverted by means of an inverter 81-5 so as to apply a 0 to gate 81-1.

When the B Sel signal is a 1, the A Sel signal is a 0 such that the input multiplexing gate 81-1 becomes enabled to pass the serial output of register unit 80 back into its input via OR gate 81-4. In addition, the B Sel signal enables the demultiplexing gate 82-2 to pass the serial output of the register unit 80 to the B Buss. For PUSH STACK operations, the demultiplexing AND gate 82-3 is enabled by the PUSH signal to pass the serial output of the register unit 80 to the register stack 86. The register stack 86 may consist of an open ended serial connection of registers which have substantially the same serial operating connections as the illustrated register 12.

For POP STACK operations, the input multiplexing gate 81-3 is enabled by the 1 value of the A Sel signal and by the POP signal to pass the serial output of register stack 86 to the serial input of register unit 80. The POP signal is also inverted by an inverter 81-6 so as to inhibit gate 81-2 from gating the D BUSS data during POP operations.

It should be noted that the illustrated register 12 in FIG. 10 is by way of example only and that other register constructions may be employed. In addition, more or less input and output signal paths may be provided for the register unit 80.

Figure 11:
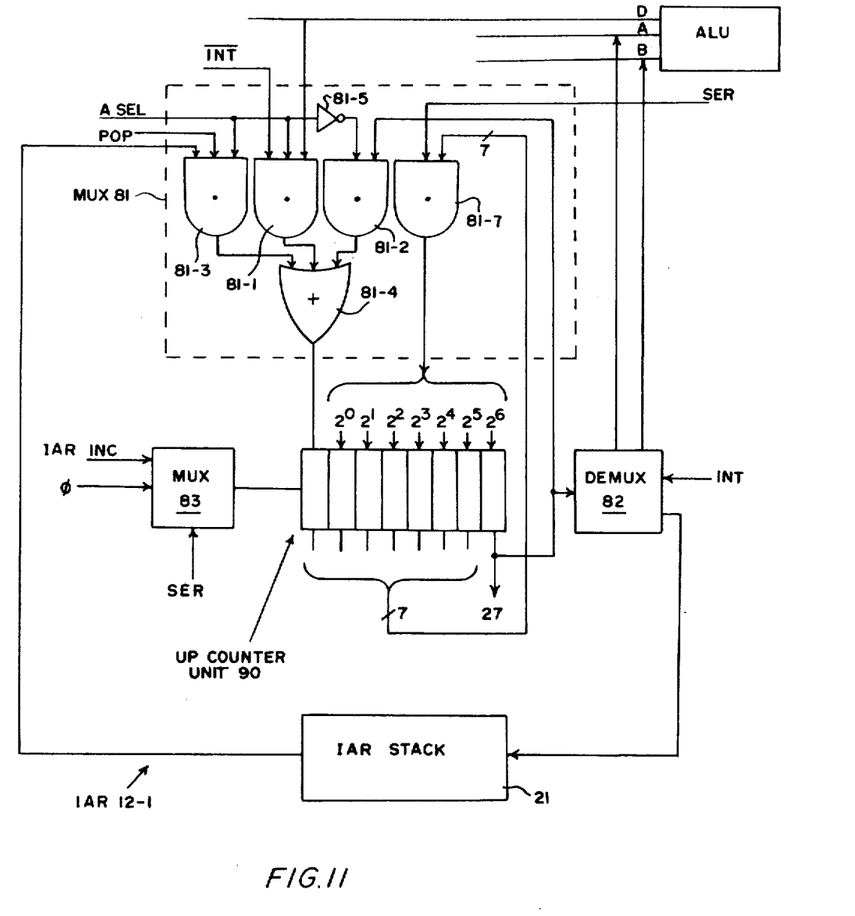
FIG. 11 is a block diagram, in part, and a logic schematic, in part, of an exemplary instruction address register which can be employed in the computer.

The instruction address register IAR 12-1 differs slightly from the register 12 illustrated in FIG. 10. As shown in FIG. 11, the register unit 80 is replaced by an UP counter unit 90, which is selectable from the aforementioned catalog. In addition, the input MUX 81 includes an additional set of AND gates 81-7 which serve to route the $2^0$ through $2^6$ stage outputs of counter unit 90 to the $2^1$ through $2^7$ stage counter inputs during serial mode operations. These connections serve to make the counter unit 90 act like a shift register. In addition, the gate 81-1 receives the INT signal so as to be disabled during interrupt sample cycles from receiving data input from the D BUSS. As mentioned previously, this serves to place all 0's in the IAR at the end of the execute period.

The remainder of the gates in the input MUX 81 are substantially the same as shown in FIG. 10. The construction of the DEMUX 82 is also substantially the same as shown in FIG. 10 except that an additional OR gate (not shown) is included to OR the PUSH and INT signal, the OR gate output then being applied to enable the AND gate 82-3 (see FIG. 10). Finally, the MUX 83 is also the same as shown in FIG. 10 except that the EXT P strobe is replaced by the IAR INC lead and the output of the MUX 83 is applied to the clock input (C) of the first or $2^0$ counter stage. For convenience, the PUSH and some of POP in A Sel and B Sel connections have been omitted in FIG. 11.

What is claimed is:

1. In a buss type processor in which a direct address generator generates a pair of direct addresses for addressing one of a first plurality of registers in response to an address field contained within the processor instruction set; the improvement comprising
   a second plurality of registers each accessed by a pair of indirect addresses,
   first and second multiplexers jointly responsive to the contents of said one of said first plurality of registers and to said pair of direct addresses to select a portion of the contents of said one of said first plurality of registers, and
   first and second decoders jointly responsive to said portion of the contents of said one of said first plurality of registers selected by said first and second multiplexers to generate a pair of indirect addresses to address one of said second plurality of registers.

2. In a buss type processor in which a direct address generator generates a pair of direct addresses for addressing one of a first plurality of registers in response to an address field contained within the processor instruction set, the improvement comprising
   a second plurality of registers each accessed by a pair of indirect addresses,
   a first multiplexer responsive either to a first portion of one of said pair of direct addresses and to the contents of a first segment of said addressed one of said first registers, or responsive to a second portion of said one of said pair of direct addresses and to the contents of a second segment of said addressed one of said first registers to generate a first output signal, where said first or said second portion of said addresses are selected by said processor in response to programmed instruction,
   a second multiplexer responsive either to a first portion of the other of said pair of direct addresses and to the contents of said first segment of said addressed one of said first registers or responsive to a second portion of said other of said pair of direct addresses and to the contents of said second segment of said addressed one of said first registers to generate a second output signal, where said first or said second portion of said addresses are selected by said processor in response to programmed instructions,
   a first decoder responsive to said first output signal to generate a first plurality of indirect addresses to address ones of a first group of said second plurality of registers, and
   a second decoder responsive to said second output signal to generate a second plurality of indirect addresses to address ones of a second group of said second plurality of registers.

3. The invention in accordance with claim 2 wherein said first multiplexer comprises a first and a second logic AND gate network and said second multiplexer comprises a third and a fourth logic AND gate network and wherein said first AND gate network has inputs of said first portion of said one of said pair of direct addresses and the contents of said first segment of said addressed one of said first registers, said second AND gate networks has inputs of said second portion of said one of said pair of direct addresses and the contents of said second segment of said addressed one of said first registers, said third AND gate network has inputs of said first portion of the other of said pair of direct addresses and the contents of said first segment of said addressed one of said first registers, and said fourth AND gate network has inputs of said second portion of the other of said pair of direct addresses and the contents of said second segment of said addressed one of said registers.

4. The invention in accordance with claim 3 wherein said first multiplexer further comprises a first logic OR gate network the inputs of which are connected to outputs of said first and second AND gate networks and the outputs of said first OR gate network are connected to said first decoder, and wherein said second multiplexer further comprises a second logic OR gate network the inputs of which are connected to outputs of said third and fourth AND gate networks and the outputs of said second OR gate network are connected to said second decoder.

* * * * *